United States Patent [19]
Hutchins et al.

[11] Patent Number: 5,508,855
[45] Date of Patent: Apr. 16, 1996

[54] TRACKING THRESHOLD CIRCUIT FOR PEAK DETECTION

[75] Inventors: Robert A. Hutchins; Ara S. Patapoutian, both of Tucson, Ariz.

[73] Assignee: International Business Machines Corporation, Armonk, N.Y.

[21] Appl. No.: 418,691

[22] Filed: Apr. 7, 1995

Related U.S. Application Data

[62] Division of Ser. No. 129,531, Sep. 30, 1993.

[51] Int. Cl.$^6$ .............................. G11B 5/09; H04N 5/76; H04L 25/06
[52] U.S. Cl. .............................. 360/46; 375/317; 369/59; 327/355
[58] Field of Search .................................. 360/32, 46, 53; 369/53, 54, 59, 60; 375/76; 327/58, 355, 356, 361

[56] References Cited

U.S. PATENT DOCUMENTS

| | | | |
|---|---|---|---|
| 4,399,474 | 8/1983 | Coleman, Jr. | 360/46 |
| 4,837,642 | 6/1989 | Smidth | 360/46 |
| 5,060,088 | 10/1991 | Dolivo et al. | 360/46 |
| 5,311,178 | 5/1994 | Pan et al. | 360/46 |

*Primary Examiner*—Aristotelis Psitos
*Assistant Examiner*—W. Chris Kim
*Attorney, Agent, or Firm*—Manny W. Schecter; Duke W. Yee; Andrew J. Dillon

[57] ABSTRACT

A method and apparatus for detecting peaks in a signal which comprises an alternating polarity waveform including a plurality of points. A selected point in the signal is designated. Thereafter, a threshold value for the selected point is established utilizing a prior threshold value associated set off with spaces with a point prior to the selected point as follows:

$$(m(n)=t0*ax(n)+t1*m(n-1))$$

wherein n is the point identifier, m(n) is the threshold value, t0 is a fixed positive constant less than one, t1 is a fixed positive constant less than one, ax(n) is the absolute value of the input signal, and m(n−1) is the prior threshold value for the prior point. In this manner the threshold value may be adjusted for fluctuations in amplitude of the signal. Next, the selected point is compared with the threshold value to determine whether or not the selected point is within a predetermined distance of the threshold. If the selected point is within the predetermined distance of the threshold value, a determination is made as to whether or not the selected point represents a peak in order to ascertain the presence of a logic one at the selected point, wherein digital data may be detected in a signal.

5 Claims, 11 Drawing Sheets

$q(n) = ((x(n)>m1(n))$ and $(x(n)>+Clamp))$ or $((x(n)<m2(n))$ and $(x(n)<-Clamp))$

TRACKING THRESHOLD CIRCUIT FOR PEAK DETECTION

This is a Division, of application Ser. No. 08/129,531, filed Sep. 30, 1993, currently pending.

BACKGROUND OF THE INVENTION

1. Technical Field

The present invention relates to peak detection of signal waveforms, and in particular to an improved peak detection system. Still more particularly, the present invention provides a circuit for producing an adaptive threshold value for use with a peak detection system.

2. Description of the Related Art

In retrieving data from a storage system, a read channel is typically utilized to convert the data into a digital format. In a magnetic tape system, data is sensed by a read head and transformed into an analog signal. The analog signal may be amplified and filtered. Next, the signal is sampled and converted into a digital signal by an analog to digital (A/D) converter. Next a peak detector is employed in a read channel to aid in detecting logical ones and zeros in the digital signal. A peak detector is a data detection system that recognizes logic ones and zeros by locating the peaks of a waveform. The peak detector interprets a peak as a logic one. A peak detector typically performs two tests to detect a peak. First, the peak detector locates peaks in the waveform by locating the zero crossing of the derivative of the waveform, since a peak is associated with a derivative value of zero. In addition to detecting zero crossings, the peak detector also compares the peak value to a threshold. For a peak to qualify as a logic one, the peak value of the waveform should be greater than a predetermined threshold value. The threshold value is designed to be a fraction of the peak, usually 50 percent of the peak.

Such a system, however, may miss peaks or interpret noise as a peak as a result of signal amplitude variations in the read channel. Sources of signal amplitude variations may occur in many ways. For example in a magnetic tape system, variations in signal amplitude may occur as a result of the magnetic tape lifting off the read head due to particles or artifacts located on the magnetic tape. Vibrations and other conditions also may cause the magnetic tape to lift off the read head.

Some peak detectors have circuits for providing an adjustable threshold value. However, these circuits use the output of a peak detector as feedback to set or adjust the threshold value.

Therefore, it would be desirable to have a method and system for providing an adaptive threshold value to reduce errors in peak detection which occur as a result of signal amplitude variations.

SUMMARY OF THE INVENTION

It is therefore one object of the present invention to provide a method and apparatus for peak detection of signal waveforms.

It is another object of the present invention to provide a method and apparatus for an improved peak detection system.

It is yet another object of the present invention to provide a method and apparatus for producing an adaptive threshold value for use with a peak detection system.

The foregoing objects are achieved as is now described. The present invention provides a method and apparatus for detecting peaks in a signal which comprises an alternating polarity waveform including a plurality of points. A selected point in the signal is designated. Thereafter, a threshold value for the selected point is established utilizing a prior threshold value associated set off with spaces with a point prior to the selected point as follows:

$$m(n)=[t0*ax(n)]+[t1*m(n-1)]$$

wherein n is the point identifier, m(n) is the threshold value, t0 is a fixed positive constant less than one, t1 is a fixed positive constant less than one, ax(n) is the absolute value of the input signal, and m(n-1) is the prior threshold value for the prior point. In this manner the threshold value may be adjusted for fluctuations in amplitude of the signal. Next, the selected point is compared with the threshold value to determine whether or not the selected point is within a predetermined distance of the threshold. If the selected point is within the predetermined distance of the threshold value, a determination is made as to whether or not the selected point represents a peak in order to ascertain the presence of a logic one at the selected point, wherein digital data may be detected in a signal.

The present invention also may include a digital threshold tracking circuit. The digital threshold tracking circuit also contains a first multiplier circuit coupled to an input, wherein an input signal received at the input is multiplied by a first predetermined value to produce a first multiplied signal. A delay circuit is employed to produce a delay in each signal applied to the delay circuit. The delay circuit is then coupled to the output of the digital threshold tracking circuit to produce a delayed output signal.

A second multiplier circuit is coupled to the delay circuit and receives the delayed output signal from the delay circuit. The delayed output signal is multiplied by a second predetermined value utilizing the second multiplier circuit to produce a second multiplied signal. A summing circuit is then coupled to the first multiplier circuit, second multiplier circuit, and the output of the digital threshold tracking circuit. The summing circuit sums the first and second multiplied signals to produce an output signal and couples the output signal to the output of the digital threshold tracking circuit, wherein an adaptive tracking threshold signal may be produced for use in a peak detector.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIGS. 9A–13B are illustrations of input and output waveforms from a tracking threshold circuit provided in accordance with a preferred embodiment of the present invention.

DETAILED DESCRIPTION OF PREFERRED EMBODIMENT

Figure 1:
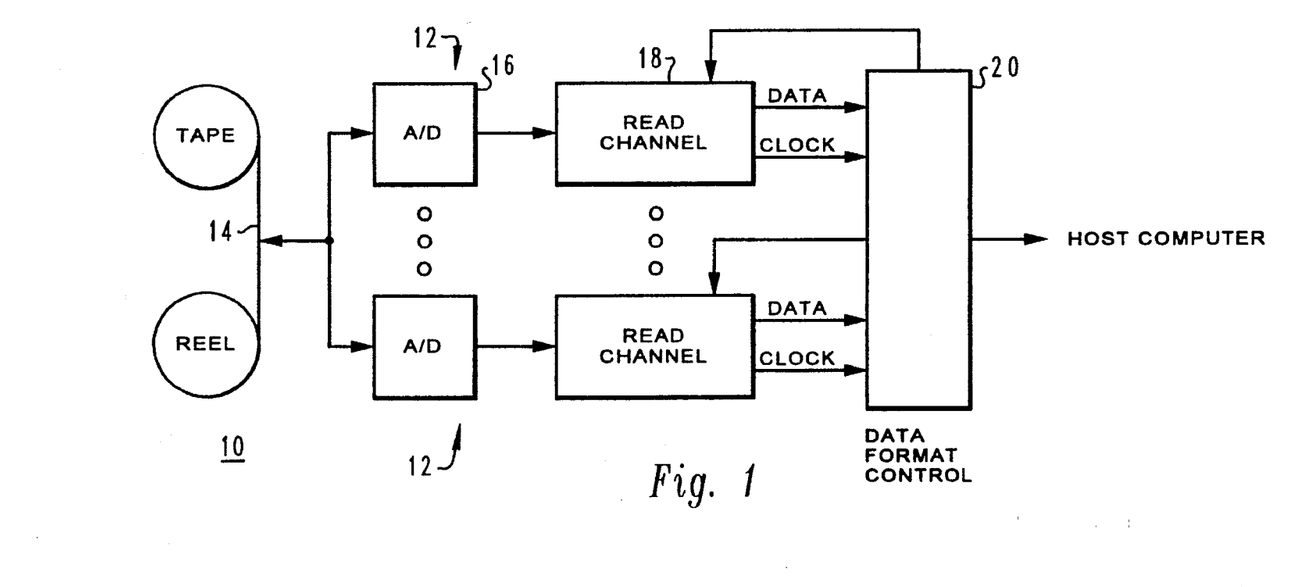
FIG. 1 is a high level block diagram of a plurality of parallel bit stream data recovery channels in a magnetic tape storage system which incorporate the tracking threshold circuit.

With reference now to the figures and in particular with reference to FIG. 1, is a block diagram of a data recovery unit 10 comprising a plurality of parallel data recovery channels 12 is illustrated. Each channel 12 is dedicated to one of a plurality of tracks on a data storage system 14 of the moving magnetic tape type. Storage system 14 includes a transducer, buffering and amplification circuitry (not shown) well known in the art for recovery of a raw data signal. Although the invention is illustrated with a tape system, those skilled in the art will now realize that the invention can be employed with other types of moving storage systems. Analog to digital converter ("A/D") 16 converts analog data detected from data storage system 14 into a digital format. The converted data is then sent to read channel 18, which converts the digitized data into logical data. Read channel 18 generates a data stream and a clock which are applied to data format control 20 for recovery of data bytes usable by a host computer system (not shown).

Although data storage system 14 is depicted as a moving magnetic tape system, other types of data storage systems may be employed such as a direct access memory system ("DASD").

Figure 2:
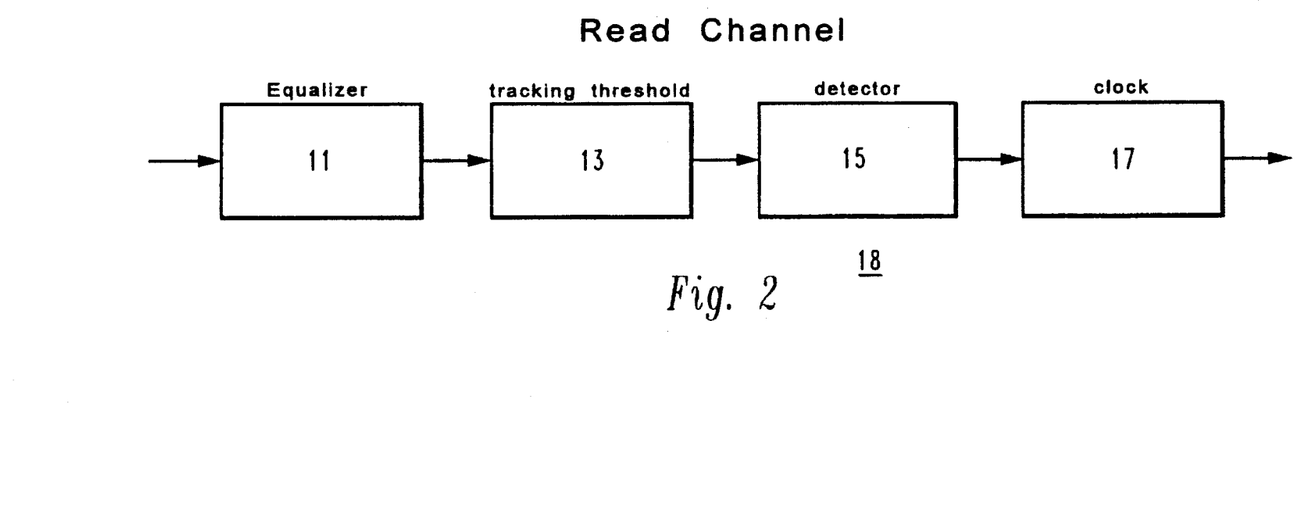
FIG. 2 depicts a block diagram of a read channel in a magnetic tape storage system in accordance with a preferred embodiment of the present invention.

Referring now to FIG. 2, a block diagram of a read channel 18 illustrated in accordance with a preferred embodiment of the present invention is depicted. Read channel 18 includes equalizer block 11, tracking threshold qualification block 13, peak detector block 15, and clock 17.

Equalizer block 11 is a digital equalizer and may be implemented using a finite impulse response (FIR) filter. The signals entering equalizer block 11 are sampled or digitized, but have not been processed to detect data, such as a logic 1 or a logic 0. The FIR digital filter is employed to shape the waveform input in equalizer block 11. The output of equalizer block 11 is sent into tracking threshold qualification block 13, which generates an indication of whether the equalizer sample is greater than the tracking threshold.

Positive values are compared to the positive tracking threshold and negative values are compared to the negative tracking threshold in accordance with a preferred embodiment of the present invention. The equalized samples are compared to these tracking thresholds and to a "clamp". If the equalizer sample is positive, greater than the positive tracking threshold, and greater than the positive "clamp" then the qualification bit is set. Similarly, for the negative samples if the sample is negative, less than the negative tracking threshold, and less than the "clamp" then qualification bit also is set.

Afterward, the output of tracking threshold qualification block 13 is sent to peak detector circuit 15. This block utilizes the tracking threshold qualification bit and the equalizer output to recognize logic 1's and logic 0's in the digitized signal.

Equalizer block 11 in read channel 18 in FIG. 1 is generally well known and may be implemented in a number of ways known to those of ordinary skill in the art. Detector block 15 may be implemented as disclosed in pending application Ser. No. 08/073,921, entitled "ASYNCHRONOUS DIGITAL THRESHOLD DETECTOR FOR A DIGITAL DATA SOURCE CHANNEL", Attorney Docket No. SA9-92-037, filed on Jun. 7, 1993. The disclosed application is assigned to the same assignee as in this application and the disclosure of which is incorporated by reference herein. Clock circuit 17 may be constructed as disclosed in pending application Ser. No. 08/097,503, entitled "BIT STREAM RATE ASYNCHRONOUS DIGITAL PHASE-LOCKED LOOP", filed on Jul. 27, 1993, and pending application Ser. No. 07/967,588, entitled "DISCRETE TIME CONTROL LOOP METHOD AND APPARATUS FOR CLOCKING DATA IN AN ASYNCHRONOUS CHANNEL", Attorney Docket No SA9-91-099, filed on Oct. 28, 1992. These two disclosed applications are assigned to the same assignee as in this application, and the disclosure of which is incorporated by reference herein.

Figure 3:
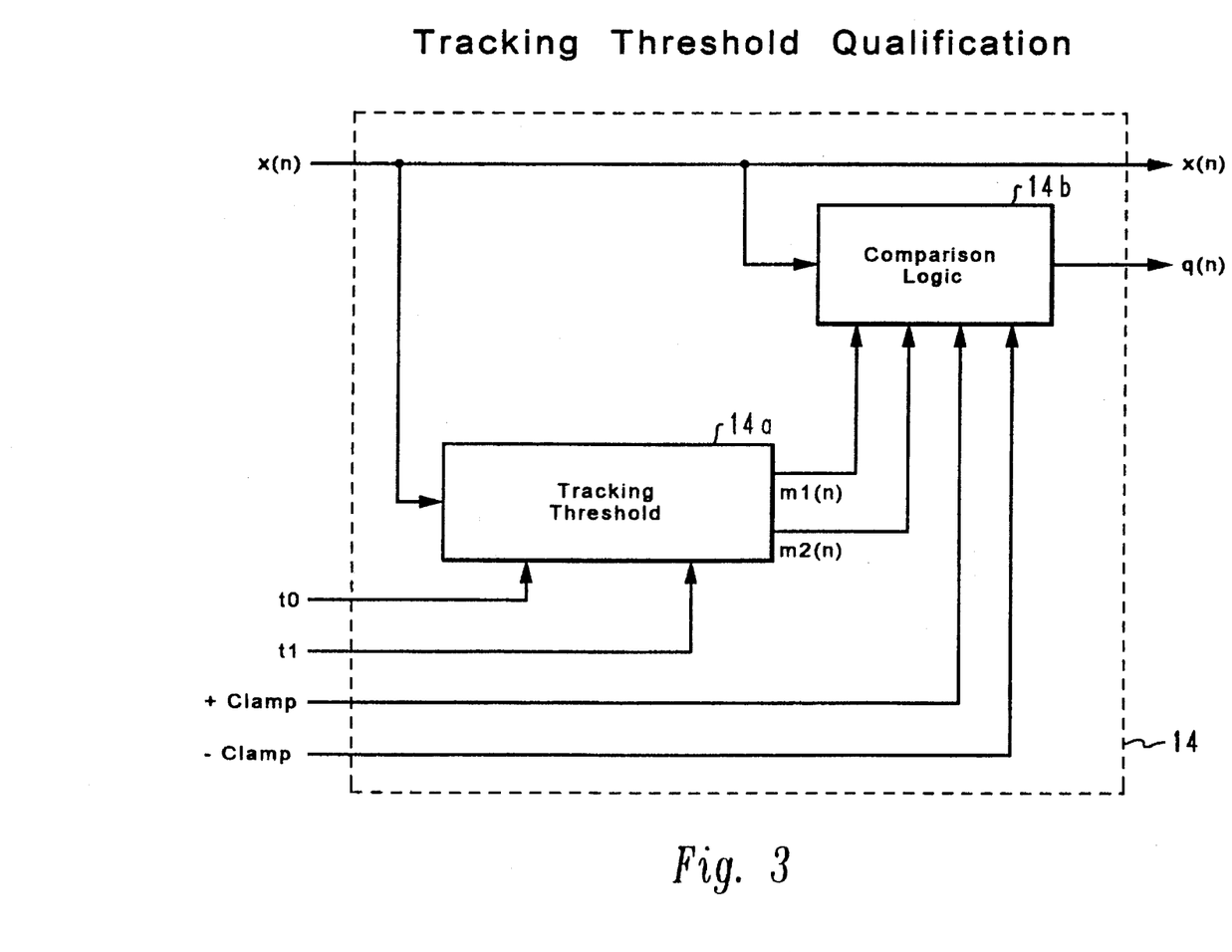
FIG. 3 is a block diagram of tracking threshold qualification block 13 in FIG. 2.

Referring now to FIG. 3, a block diagram of tracking threshold qualification block 13 in FIG. 2. Tracking threshold qualification block 13 has inputs for signal x(n), a waveform from equalizer block 11. Additionally, tracking threshold qualification block 13 includes inputs t0, t1, +clamp, and −clamp. An output for signal x(n) and a qualification bit q(n) are provided within tracking threshold qualification block 13. This block includes a tracking threshold circuit 14a and a comparison logic circuit 14b. Tracking threshold circuit 14a provides a positive threshold value, m1(n), and a negative threshold value m2(n), which is sent to comparison logic circuit 14b. Signal x(n) is compared with threshold values m1(n) or m2(n), depending on whether signal x(n) is positive or negative.

Comparison logic circuit 14b sets qualification bit q(n) if the signal x(n) is within a specified distance of the threshold set by tracking threshold values m1(n) and m2(n). Typically, if signal x(n) is positive, it should be above m1(n). If signal x(n) is negative, it should be less than m2(n). Additionally, comparison logic circuit 14b includes inputs for +clamp and −clamp to set a limit on tracking threshold values m1(n) and m2(n). Qualification bit q(n) is utilized by peak detector block 15 in detecting logic 1 and logic 0 data in signal x(n).

Figure 4:
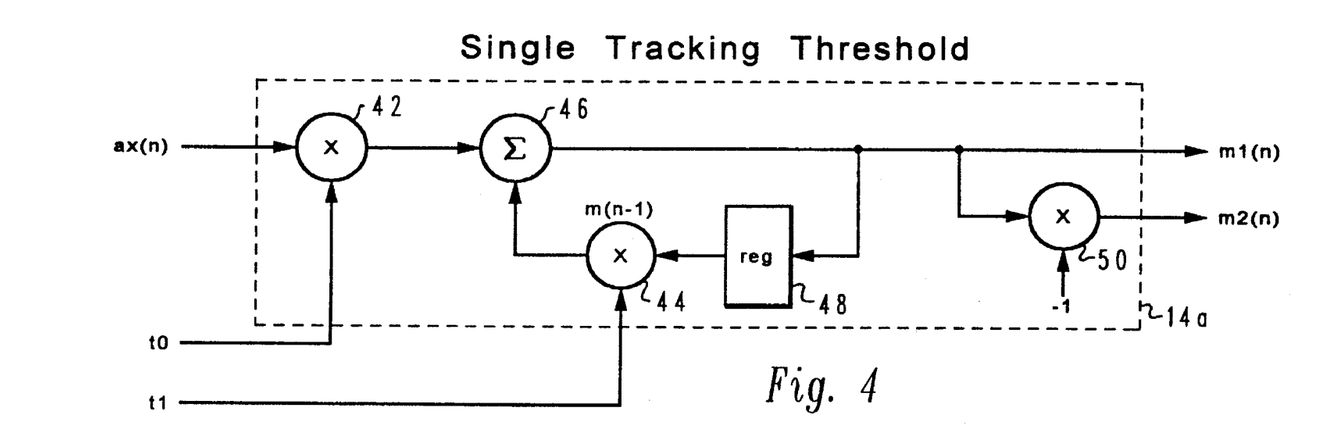
FIG. 4 depicts a block diagram of a tracking threshold circuit provided in accordance with a preferred embodiment of the present invention.

Referring now to FIG. 4, a block diagram of a single tracking threshold circuit 14a in accordance with a preferred embodiment of the present invention is depicted. The single tracking threshold circuit depicted in FIG. 4 includes multiplier blocks 42 and 44, summing block 46, and register block 48. Incoming signal ax(n) is multiplied by constant t0 at multiplier block 42. Threshold value signal m1(n) is directed into register block 48 to produce a signal m1(n−1), which is a threshold value delayed by one sample. Register 48 may be implemented in a number of ways known to those of ordinary skill in the art. For example, register block 48 may be implemented using a D flip-flop. The output from register block 48 is multiplied by a constant t1 at multiplier block 44. The output from multiplier block 44 is summed with the output from multiplier block 42 at summation block 46 to produce threshold value signal m1(n) in accordance with a preferred embodiment of the present invention. A tracking threshold value signal m2(n) is produced for detecting negative peaks by multiplying threshold value signal m1(n) by a negative 1 at multiplier block 50.

The present invention provides an adaptive threshold generator or tracking threshold circuit to reduce the effects of signal amplitude variations in the read channel. Assume x(n) denotes the incoming signal or waveform to the tracking threshold block at the time instant, wherein x(n) is the sampled and quantitized representation of the signal x(t) sampled at a fixed rate. Let ax(n) equal the absolute value of x(n) and m(n) equal the threshold value at time n. In accordance with a preferred embodiment of the present invention, the threshold value is directly updated from the incoming signal ax(n) without knowing any of the peaks. This method is performed utilizing a simple iteration for each time in with the following equation:

$$m(n) = t0 * ax(n) + t1 m(n-1)$$

wherein t0 and t1 are fixed positive constants less than one. Consequently, the estimate of the threshold value m(n) at time n is partly affected by the previous tracking threshold value m(n−1) and partly updated by the incoming signal ax(n). The value t0 and t1 are dependent on the particular type of drive system (i.e., tape or direct access storage device ("DASD")). The value t0 is typically selected by:

$$t0 = 1 - t1$$

for a threshold value that is 50 percent of the peak of the waveform. t0 is chosen as:

$$t0 < 1 - t1$$

if a threshold value less than 50 percent of the peak is desired. When a threshold value that is greater than 50 percent of the peak is required, t0 should be chosen as:

$$t0 > 1 - t1$$

If changes in signals are sudden, t0 should be increased. If the signal from the tape drive system is fairly stable, t0 is smaller. The amount of defects on the data media are also considered in selecting t0. For example, t0 in a DASD would be smaller than in a magnetic tape system.

Figure 5:
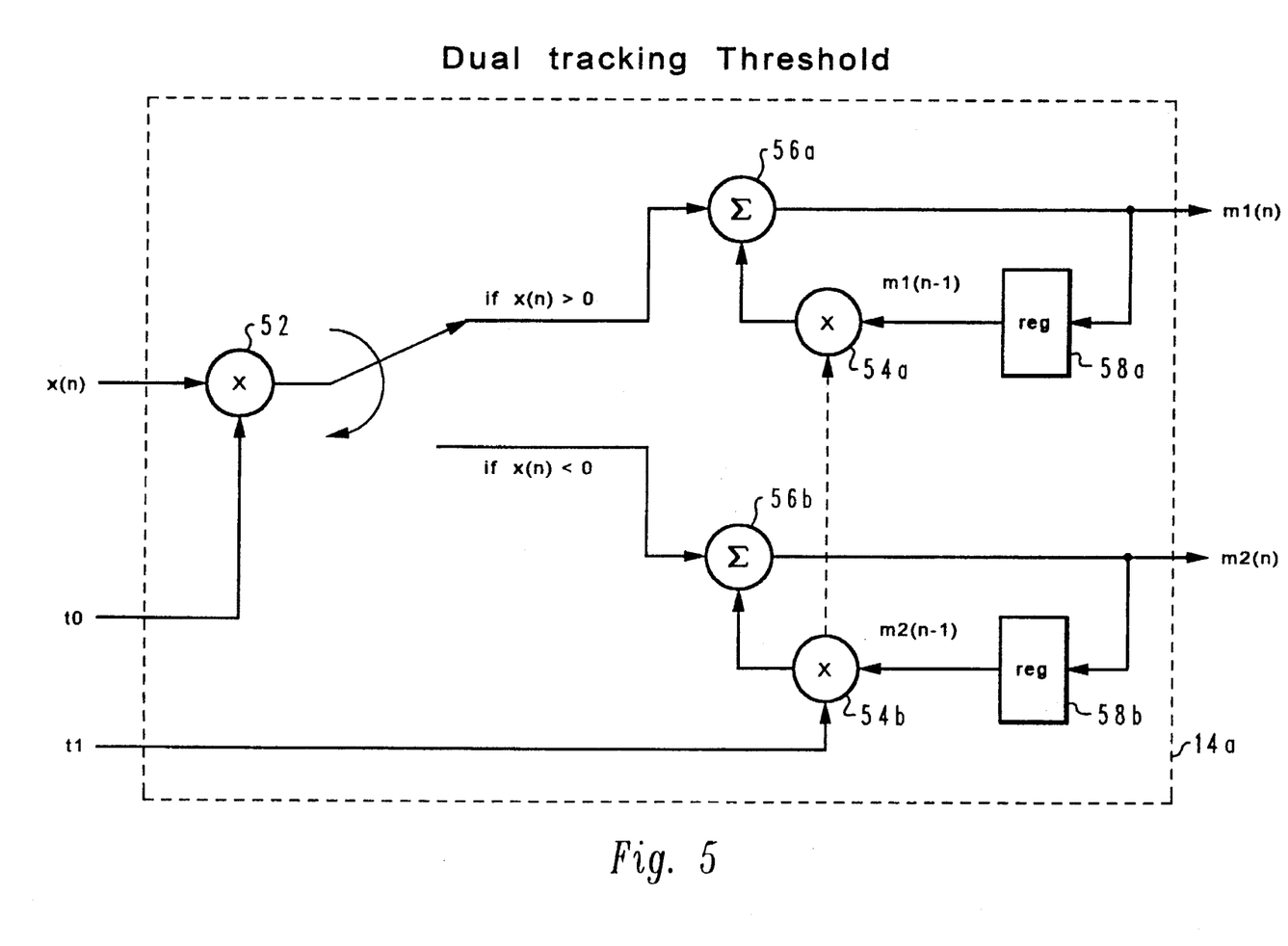
FIG. 5 is a block diagram of a dual tracking threshold circuit provided in accordance with a preferred embodiment of the present invention.

With reference now to FIG. 5, a block diagram of a dual tracking threshold circuit is depicted in accordance with a preferred embodiment of the present invention. Digital signal x(n) is sent into multiplier 52, which multiplies digital signal x(n) by a constant t0 to produce signal t0*x(n). If signal x(n) is positive, multiplier 52 is connected to summation block 56a. Threshold value signal m1(n) is delayed at register block 58a to produce signal m1(n−1). This signal is multiplied by a constant t1 at multiplier 54a. The threshold value m1(n) is produced by summing the outputs from multipliers 52 and 54a at summation block 56a.

In the situation in which signal x(n) is negative, multiplier 52 is connected to summation block 56b instead of summation block 56a. Threshold value signal m2(n) is fed into register block 58b, resulting in a delayed signal m2(n−1). This signal is multiplied by a constant t1 at multiplier 54b. The threshold value signal m2(n) is produced by summing the output from multipliers 52 and 54b.

Figure 6:
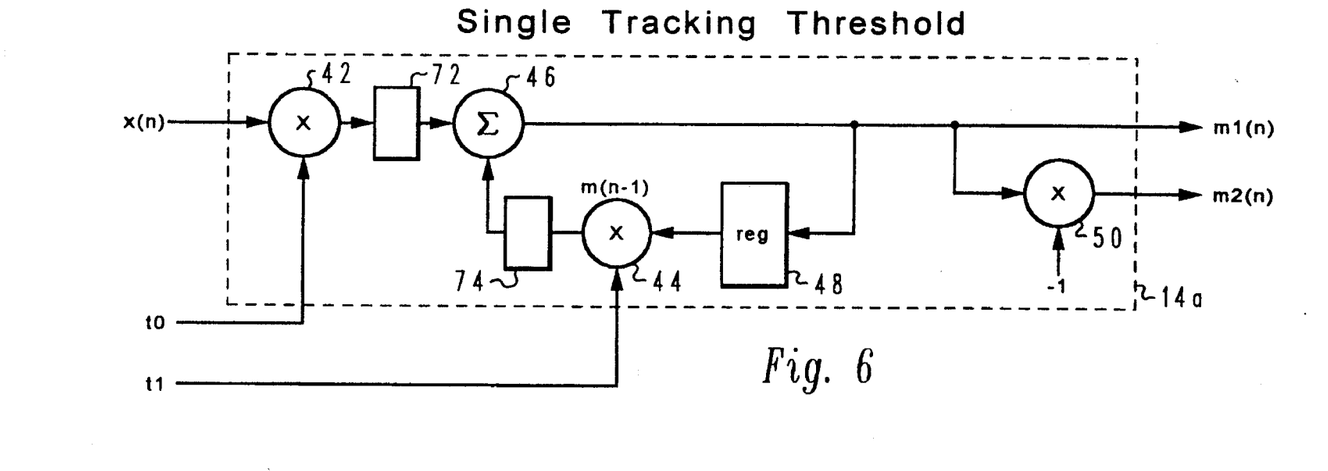
FIG. 6 depicts a block diagram of a high speed tracking threshold circuit provided in accordance with a preferred embodiment of the present invention.

Referring next to FIG. 6, a block diagram of a high speed tracking threshold circuit is depicted in accordance with a preferred embodiment of the present invention. The high speed tracking threshold circuit is similar to the single threshold tracking circuit in FIG. 3 except that register block 72 has been placed between multiplier 42 and summation block 46, and register block 74 has been placed between multiplier 44 and summation block 46. The delays provided by register 72 and 74 are required because summation block 46 cannot perform its function fast enough to keep up with multipliers 42 and 44.

Figure 7:
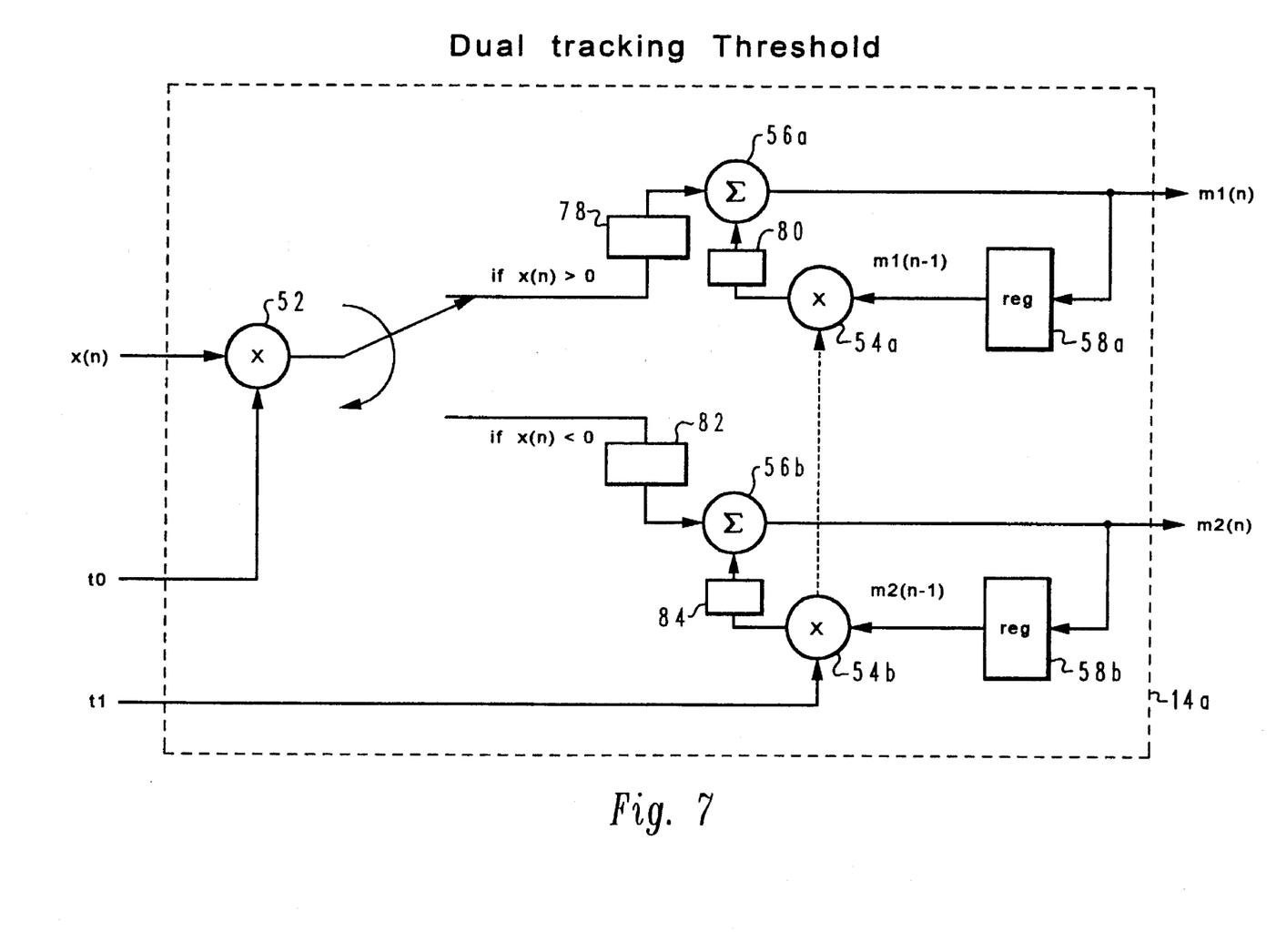
FIG. 7 is a block diagram of a high speed dual tracking threshold circuit provided in accordance with a preferred embodiment of the present invention.

Referring now to FIG. 7, a block diagram of a high speed dual tracking threshold circuit is depicted in accordance with a preferred embodiment of the present invention. The high speed dual tracking threshold circuit is similar to the dual tracking threshold circuit in FIG. 5 with the addition of register blocks 78, 80, 82, and 84 to provide needed delays for summation blocks 56a and 56b. In accordance with a preferred embodiment of the present invention, the various block diagrams in FIGS. 4–7 may be implemented in logic circuits well known to those skilled in the art, such as a 16-bit CMOS cascadable ALU available and a 16×16 parallel CMOS multiplier from Integrated Device Technology, Inc., located in Santa Clara, Calif.

Figure 8:
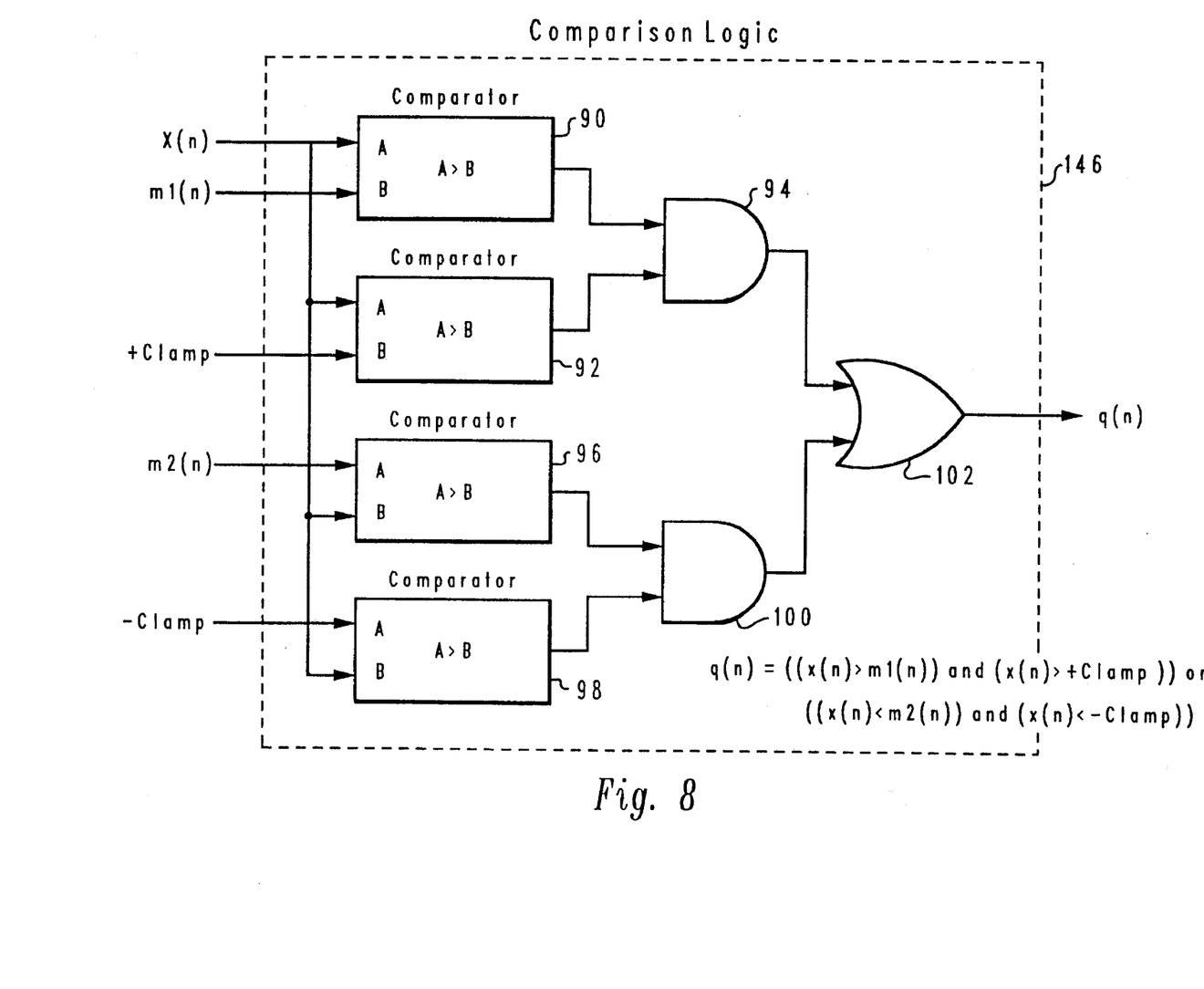
FIG. 8 depicts a block diagram of a comparison logic circuit provided in accordance with a preferred embodiment of the present invention.

With reference now to FIG. 8, a block diagram of comparison logic circuit 14b in FIG. 3 is depicted in accordance with a preferred embodiment of the present invention. Comparison logic circuit 14b implements:

$$q(n) = ((x(n) > m1(n)) \text{ and } (x(n) > +\text{clamp})) \text{ or } \\ ((x(n) < m1(n)) \text{ and } (x(n) < -\text{clamp}))$$

Comparison logic circuit 14b includes comparator 90, which has inputs for signal x(n) and threshold value signal m1(n). Comparator 90 generates a logic 1 output if x(n) is greater than m1(n). Comparator 92 compares x(n) with +clamp and outputs a logic 1 if x(n) is greater than +clamp. The output of comparator 90 and 92 are directed into AND gate 94.

Comparator 96 compares signal x(n) with threshold value signal m2(n) and produces a logic 1 output if m2(n) is greater than x(n). Comparator 98 is employed to compare x(n) with −clamp. A logic 1 is produced by comparator 98 if x(n) is less than −clamp. The output of comparators 96 and 98 are sent to AND gate 100. The output of and gates 94 and 100 are sent to OR gate 102, which has an output representing qualification bit q(n). The blocks of comparison logic circuit 14b may be implemented using various circuits well known to those of ordinary skill in the art, such as, for example, logic circuits or a programmable array logic circuit using combinatorial logic. In accordance with a preferred embodiment of the present invention, a programmable array logic circuit may be programmed in PALASM using the program found in the Appendix to perform the functions of comparison logic circuit 14b as illustrated in FIG. 8.

Figure 9A:
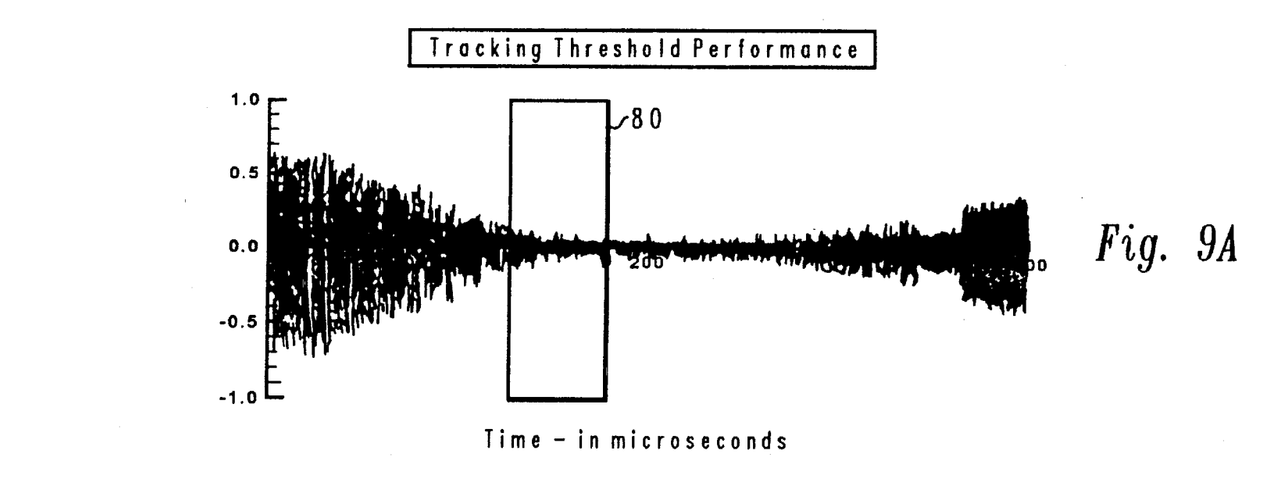
Figure 9B:
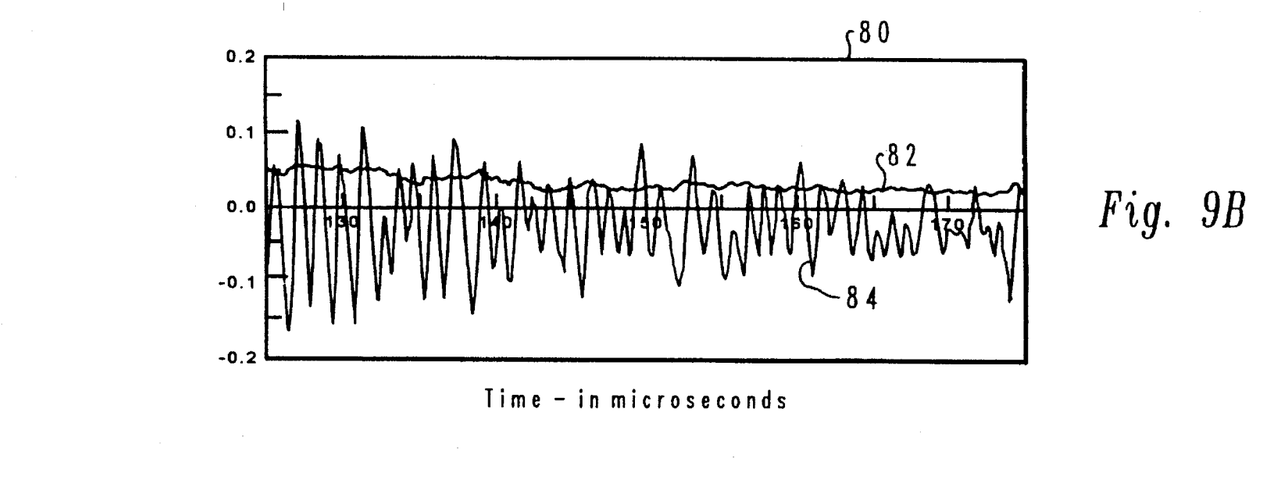

FIGS. 9A and 9B illustrate input and output waveforms from a single tracking threshold circuit. FIG. 9B is a enlargement of window 80 in FIG. 9A. Waveform 82 is the tracking threshold circuit output in response to input waveform 84. The input waveform illustrates a situation in which a defect in a magnetic tape or a lift off from a magnetic surface results in a loss of signal.

Figure 10:
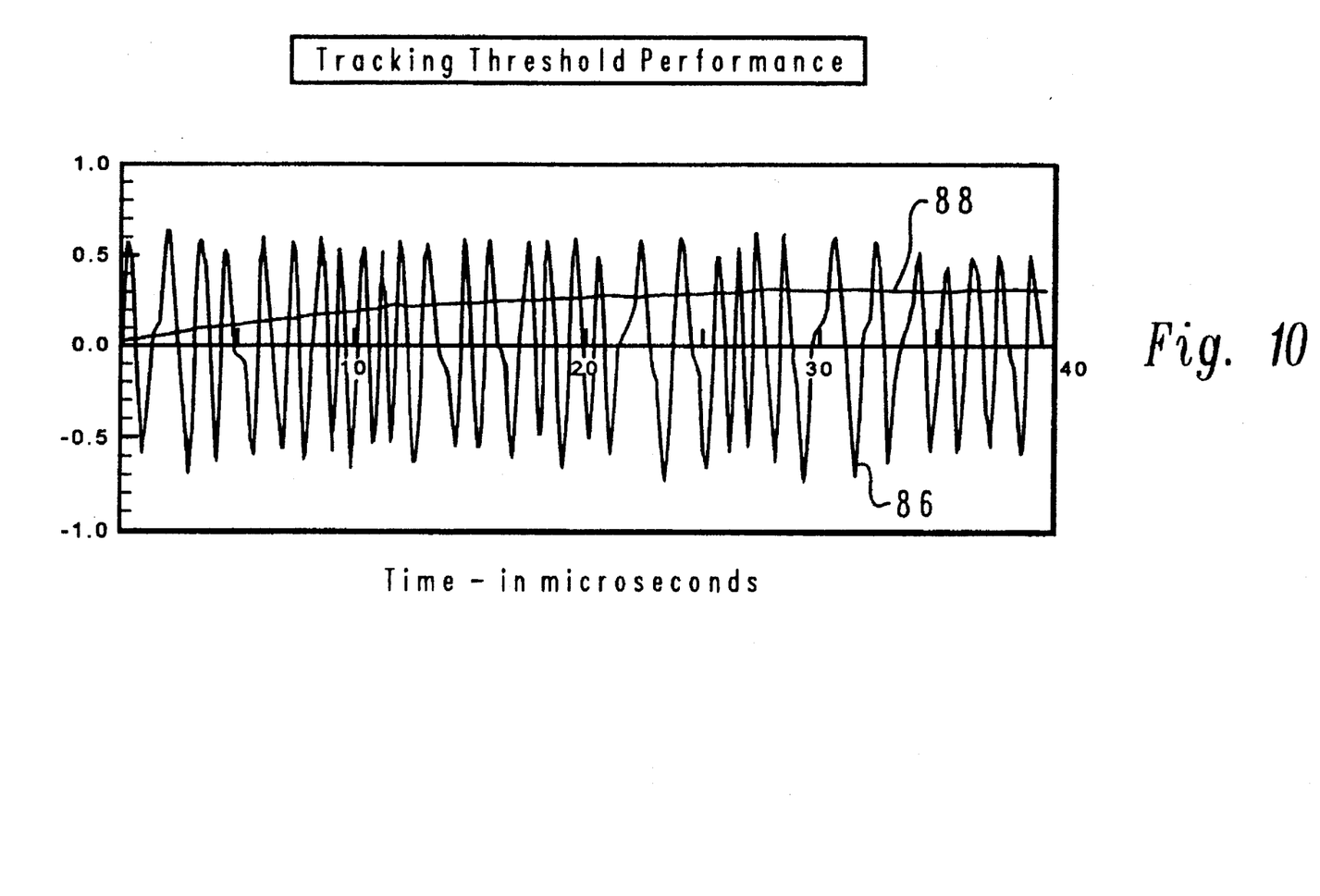

FIG. 10 illustrates an input waveform 86 and an output waveform 88 from a single tracking threshold circuit. Waveform 88 begins at a zero state and increases to the threshold level set for waveform 86.

Figure 11A:
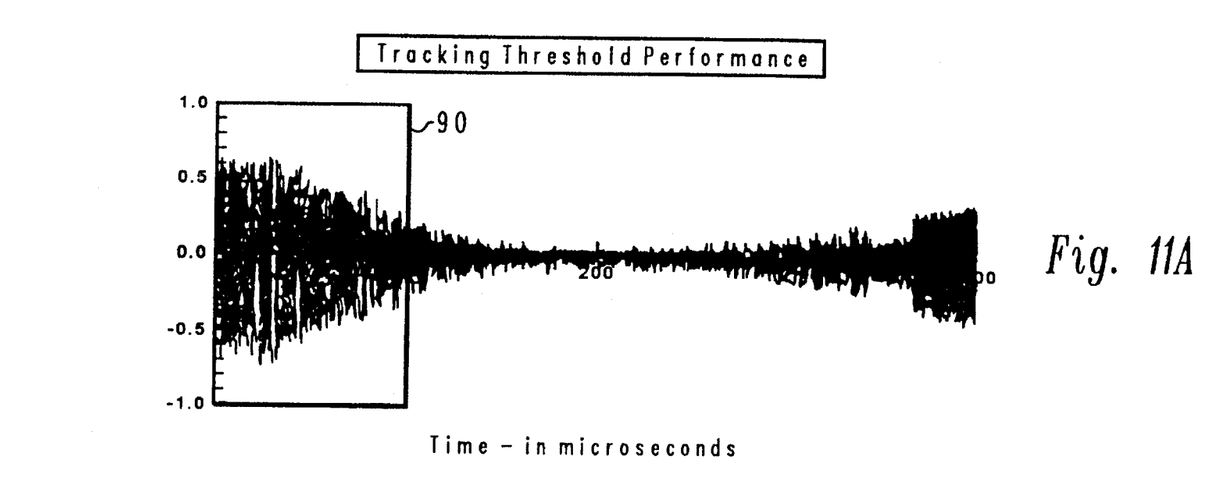
Figure 11B:
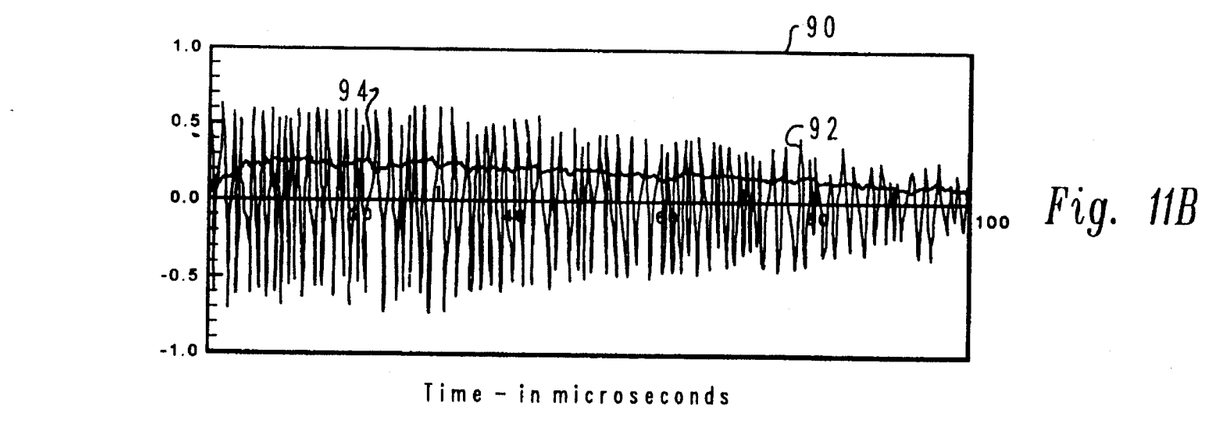

FIGS. 11A and 11B depict input and output waveforms from a single tracking threshold circuit. FIG. 11B shows a close up of window 90 in FIG. 11A. An input waveform 92 applied to a tracking threshold circuit in accordance with a preferred embodiment of the present invention results in a waveform 94, representing the threshold signal produced by the tracking threshold circuit. Window 90 illustrates the beginning of threshold tracking at time equal to zero seconds. As can be seen waveform 94 increases from zero and tracks waveform 92 to provide an adaptable tracking threshold level.

Figure 12:
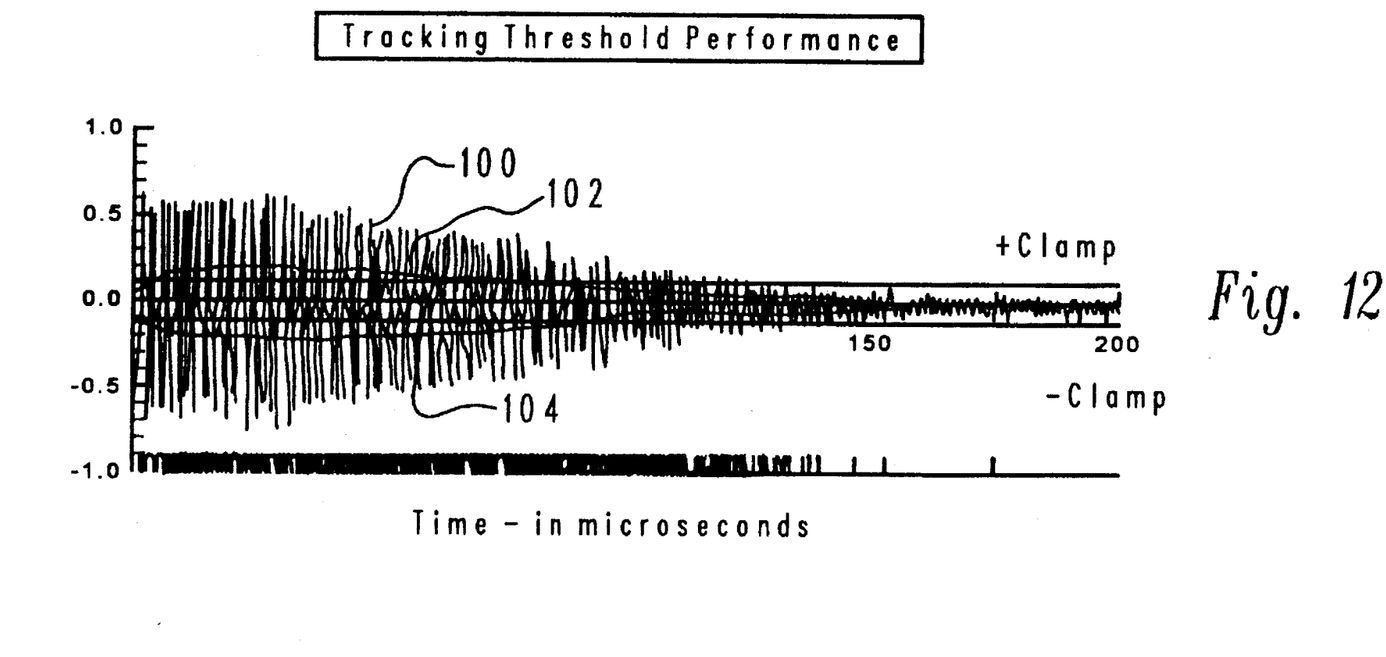

Referring next to FIG. 12, a graph of input signal 100 is illustrated with a positive tracking threshold waveform 102 and a negative tracking threshold waveform 104 and +clamp and −clamp is illustrated. Waveforms 102 and 104 are produced in response to waveform 100 being applied to a dual tracking threshold circuit according to the present invention. +clamp and −clamp are employed to set levels at which large defects should be ignored in peak detection to avoid the introduction of noise into the peak detection circuit.

Figure 13A:
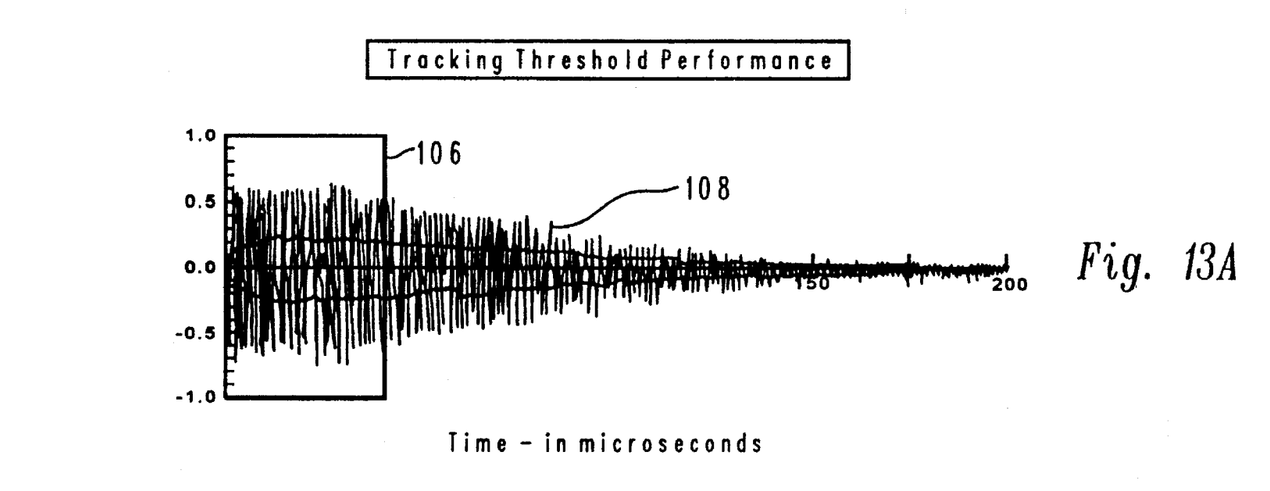
Figure 13B:
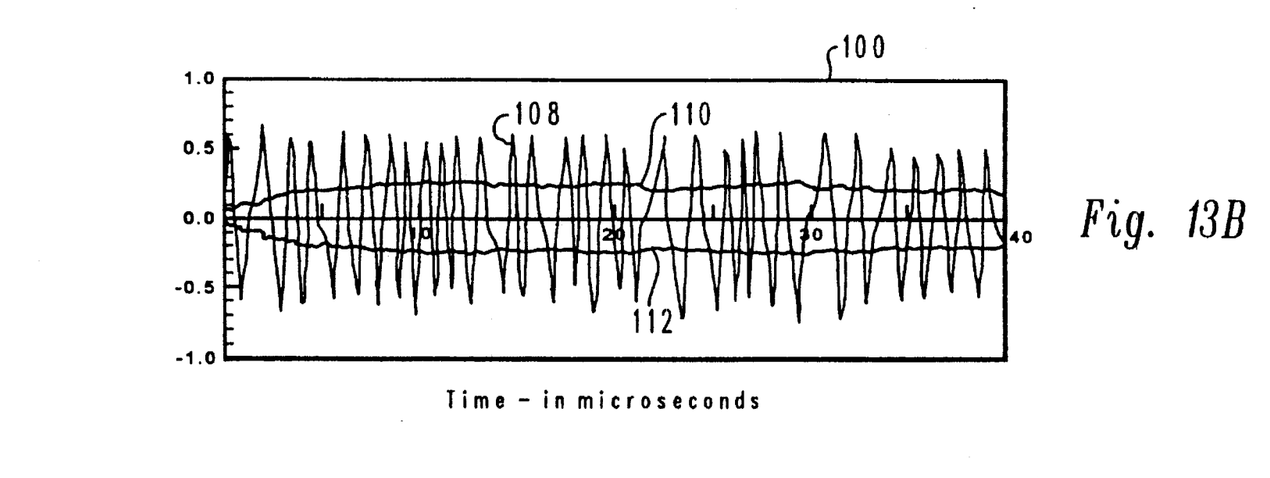

FIGS. 13A and 13B depict graphs of input and output waveforms from a dual tracking threshold circuit in accordance with a preferred embodiment of the present invention. FIG. 13B is a magnification of window 106 in FIG. 13A. Waveform 108 applied as an input signal results in waveforms 110 and 112. Waveform 110 represents the positive tracking threshold value while waveform 112 represents the negative tracking threshold value. As can be seen, the tracking threshold values adjust in response to changes in waveform 108.

While the invention has been particularly shown and described with reference to a preferred embodiment, it will be understood by those skilled in the art that various changes in form and detail may be made therein without departing from the spirit and scope of the invention.

APPENDIX

```
;PALASM Design Description
; TRKPAL is a chip that contains the control logic for the
tracking threshold. It controls the enable lines, ALU
function lines and the clear lines for the entire design.
;--------------------- Declaration Segment --------------
TITLE              Tracking Threshold Control PAL
PATTERN
REVISION     1.0
AUTHOR       R. A. Hutchins
COMPANY      IBM
DATE         3/30/92
CHIP              _trkpal    PAL20R6
;--------------------- PIN Declarations ---------------------
PIN   1   CLK       COMBINATORIAL   ; INPUT
PIN   2   PCLAMP    COMBINATORIAL   ; INPUT
PIN   3   NCLAMP    COMBINATORIAL   ; INPUT
PIN   4   PTHR      COMBINATORIAL   ; INPUT
PIN   5   NTHR      COMBINATORIAL   ; INPUT
PIN   6   DUALTH    COMBINATORIAL   ; INPUT
PIN   7   /COAST    COMBINATORIAL   ; INPUT
PIN   8   MSB       COMBINATORIAL   ; INPUT
PIN  13   OE        COMBINATORIAL   ; INPUT
PIN  15   /NEGEN    COMBINATORIAL   ; OUTPUT
PIN  16   /CST      REGISTERED      ; OUTPUT
PIN  17   /NDUAL    REGISTERED      ; OUTPUT
PIN  18   /NCIN     REGISTERED      ; OUTPUT
PIN  19   /PDUAL    REGISTERED      ; OUTPUT
PIN  20   /PCIN     REGISTERED      ; OUTPUT
PIN  21   /TRTH     REGISTERED      ; OUTPUT
PIN  22   /POSEN    COMBINATORIAL   ; OUTPUT
PIN  24   VCC                       ; INPUT
;----------------- Boolean Equation Segment ----------------
EQUATIONS
CST     =   COAST
POSEN   =   / (DUALTH * /COAST * MSB)
NEGEN   =   / (DUALTH * /COAST * /MSB)
PCIN    =   / (/DUALTH * /COAST * MSB)
NCIN    =   / (DUALTH * /COAST * /MSB)
PDUAL   =   /((/DUALTH * /COAST * /MSB) +
             ( DUALTH * /COAST))
```

APPENDIX-continued

```
NDUAL   =   /((/DUALTH * /COAST * MSB) +
             ( DUALTH * /COAST))
TRTH    =   /(( PCLAMP * PTHR * /MSB * /COAST) +
             ( NCLAMP * NTHR * MSB * /COAST))
```

What is claimed is:

1. A digital threshold tracking circuit comprising:

an input for receiving an input signal;

an output for generating an output signal;

a first multiplier circuit coupled to said input, wherein an input signal received at said input is multiplied by a first predetermined value to produce a first multiplied signal;

a delay circuit for producing a delay, said delay circuit being coupled to said output for receiving an output signal from said output and producing a delayed output signal;

a second multiplier circuit being coupled to said delay circuit, wherein said second multiplier receives said delayed output signal from said delay circuit, said delayed output signal being multiplied by a second predetermined value to produce a second multiplied signal; and a summing circuit coupled to said first multiplier circuit, said second multiplier circuit, and said output, said summing circuit receiving said first multiplied signal and said second multiplied signal, summing said first and second multiplied signals to produce an output signal, and sending said output signal to said output.

2. A tracking threshold unit comprising:

a unit input for receiving an input signal;

a unit output;

a tracking threshold circuit including:
  a circuit output;
  a first multiplier circuit connected to said unit input, wherein said input signal is multiplied by a first multiplier to produce a first multiplied signal;
  a delay circuit having an input connected to said circuit output to receive a threshold value signal, wherein a delayed signal is produced from said threshold value signal;
  a second multiplier circuit connected to said delay circuit, wherein said delayed signal is multiplied by a second multiplier to produce a second multiplied signal; and
  a summing circuit connected to said first multiplier circuit, said second multiplier circuit, and said circuit output, wherein said threshold value signal is produced at said circuit output by summing said first multiplied signal with said second multiplied signal; and a comparison logic circuit including:
  a first connection connected to said unit input;
  a second connection connected to said circuit output; and
  a comparator circuit having inputs connected to said first connection and said second connection and an output connected to said unit output, wherein a first output signal is generated at said unit output when said input signal is greater than said threshold value signal.

3. The tracking threshold unit of claim 2 further comprising:

a peak detector circuit connected to said unit input and said unit output, wherein a logic one is indicated at its logic output if the first output signal is detected at said unit output and a peak is detected from the input signal at said unit input.

4. The tracking threshold unit of claim 2 wherein said comparison logic circuit further includes:

a second comparator circuit having an input and an output, said input being connected to said unit input, wherein an indication of whether said input signal is above a preselected value is generated at said output of said second comparator circuit; and a logic circuit having inputs connected to the unit output and said output of said second comparator circuit, wherein a signal indicating that a valid input signal is present is generated if said input signal is greater than said threshold value signal and greater than said preselected value.

5. A magnetic tape storage system comprising:

a transducer for detecting data on a magnetic tape and creating an analog signal in response to detecting data in said magnetic tape; and an amplifier for amplifying said analog signal;

an analog to digital converter connected to said amplifier for converting said analog signal into a digital signal;

a read channel for converting said digital signal into logical data, said read channel including:
  a digital threshold tracking circuit having:
    an input for receiving said digital signal;
    an output for generating a threshold signal;
    a first multiplier circuit coupled to said input, wherein said digital signal received at said input is multiplied by a first predetermined signal to produce a first multiplied signal;
    a delay circuit for producing a delay, said delay being coupled to said output for receiving an output signal from said output and producing a delayed output signal;
    a second multiplier circuit being coupled to said delay circuit, wherein said second multiplier receives said delayed output signal from said delay circuit, said delayed output signal being multiplied by a second predetermined value to produce a second multiplied signal; and
    a summing circuit coupled to said first multiplier circuit, said second multiplier circuit, and said output, wherein said summing circuit sums said first and second multiplied signals to produce an output signal at said output to produce a threshold value signal; and
  a peak detector circuit having a first input for receiving said digital signal and a second input coupled to said output of said digital threshold tracking circuit for receiving said threshold value signal, wherein said peak detector detects logical ones and logical zeros utilizing said threshold value signal generated by said digital threshold tracking circuit to convert said digital signal into logical data; and a data format control unit for recovering data converted by said read channel for use by a data processing system.

* * * * *